(12) United States Patent
Schropp, Jr.

(10) Patent No.: US 10,324,576 B1
(45) Date of Patent: Jun. 18, 2019

(54) METHOD AND SYSTEM FOR INPUT OBJECT SEPARATION USING PIXEL RESPONSE FUNCTIONS

(71) Applicant: Synaptics Incorporated, San Jose, CA (US)

(72) Inventor: Donald R. Schropp, Jr., San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/826,641

(22) Filed: Nov. 29, 2017

(51) Int. Cl.
*G06K 9/00* (2006.01)
*G06F 3/041* (2006.01)
*G06F 3/044* (2006.01)

(52) U.S. Cl.
CPC ............ *G06F 3/044* (2013.01); *G06F 3/0416* (2013.01); *G06K 9/0053* (2013.01); *G06F 2203/04104* (2013.01)

(58) Field of Classification Search
None
See application file for complete search history.

(56) References Cited

U.S. PATENT DOCUMENTS

2010/0292945 A1* 11/2010 Reynolds ............... G06F 3/044
702/65
2011/0057670 A1* 3/2011 Jordan .................. G06F 3/0416
324/679

* cited by examiner

*Primary Examiner* — Gustavo Polo
(74) *Attorney, Agent, or Firm* — Ferguson Braswell Fraser Kubasta PC

(57) ABSTRACT

A method may include obtaining a capacitive image of various sensor pixels in an input device. The capacitive image may include various capacitive measurements resulting from the first input object and the second input object in a sensing region of the input device. The method may further include obtaining various pixel response functions corresponding to the sensor pixels. The method may further include determining, from the capacitive image and using a search method and the pixel response functions, various capacitive contributions of the first input object in the capacitive image and various capacitive contributions of the second input object. The method may further include determining, using the capacitive contributions of the first input object and the capacitive contributions of the second input object, a first location of the first input object and a second location of the second input object.

17 Claims, 8 Drawing Sheets

METHOD AND SYSTEM FOR INPUT OBJECT SEPARATION USING PIXEL RESPONSE FUNCTIONS

FIELD

This disclosed technology generally relates to electronic devices and specifically to capacitive sensing devices.

BACKGROUND

Input devices, including proximity sensor devices (e.g., touchpads, touch sensor devices, etc.), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some input devices may perform specific interface actions based on two or more fingers in a sensing region. However, current proximity sensing techniques may mistakenly identify multiple fingers as a single finger and thereby causing wrong interface actions to be performed.

SUMMARY

In general, in one aspect, the invention relates to a processing system coupled with an input device. The processing system includes a sensor module configured to obtain a capacitive image of various sensor pixels in the input device. The capacitive image includes various capacitive measurements resulting from a first input object and a second input object in a sensing region. The processing system further includes a determination module configured to obtain various pixel response functions corresponding to the sensor pixels. The determination module is further configured to determine, from the capacitive image and using a search method and the pixel response functions, various capacitive contributions of the first input object and various capacitive contributions of the second input object. The determination module is further configured to determine, using the capacitive contributions of the first input object and the capacitive contributions of the second input object, a first location of the first input object and a second location of the second input object.

In general, in one aspect, the invention relates to an input device. The input device includes various transmitter electrodes configured to transmit various sensing signals. The input device further includes various receiver electrodes configured to obtain various resulting signals in response to transmitting the sensing signals. The input device further includes a processing system operatively connected to the receiver electrodes and the transmitter electrodes. The processing system is configured to obtain, from the resulting signals, a capacitive image of various sensor pixels among the receiver electrodes. The processing system is further configured to obtain various pixel response functions corresponding to the sensor pixels. The processing system is further configured to determine, from the capacitive image and using a search method and the pixel response functions, various capacitive contributions of a first input object and various capacitive contributions of a second input object. The processing system is further configured to determine, using the capacitive contributions of the first input object and the capacitive contributions of the second input object, a first location of the first input object and a second location of the second input object.

In general, in one aspect, the invention relates to a method. The method includes obtaining a capacitive image of various sensor pixels in an input device. The capacitive image includes various capacitive measurements resulting from the first input object and the second input object in a sensing region of the input device. The method further includes obtaining various pixel response functions corresponding to the sensor pixels. The method further includes determining, from the capacitive image and using a search method and the pixel response functions, various capacitive contributions of the first input object in the capacitive image and various capacitive contributions of the second input object. The method further includes determining, using the capacitive contributions of the first input object and the capacitive contributions of the second input object, a first location of the first input object and a second location of the second input object.

Other aspects of the disclosed technology will be apparent from the following description and the appended claims.

DETAILED DESCRIPTION

Figure 1:
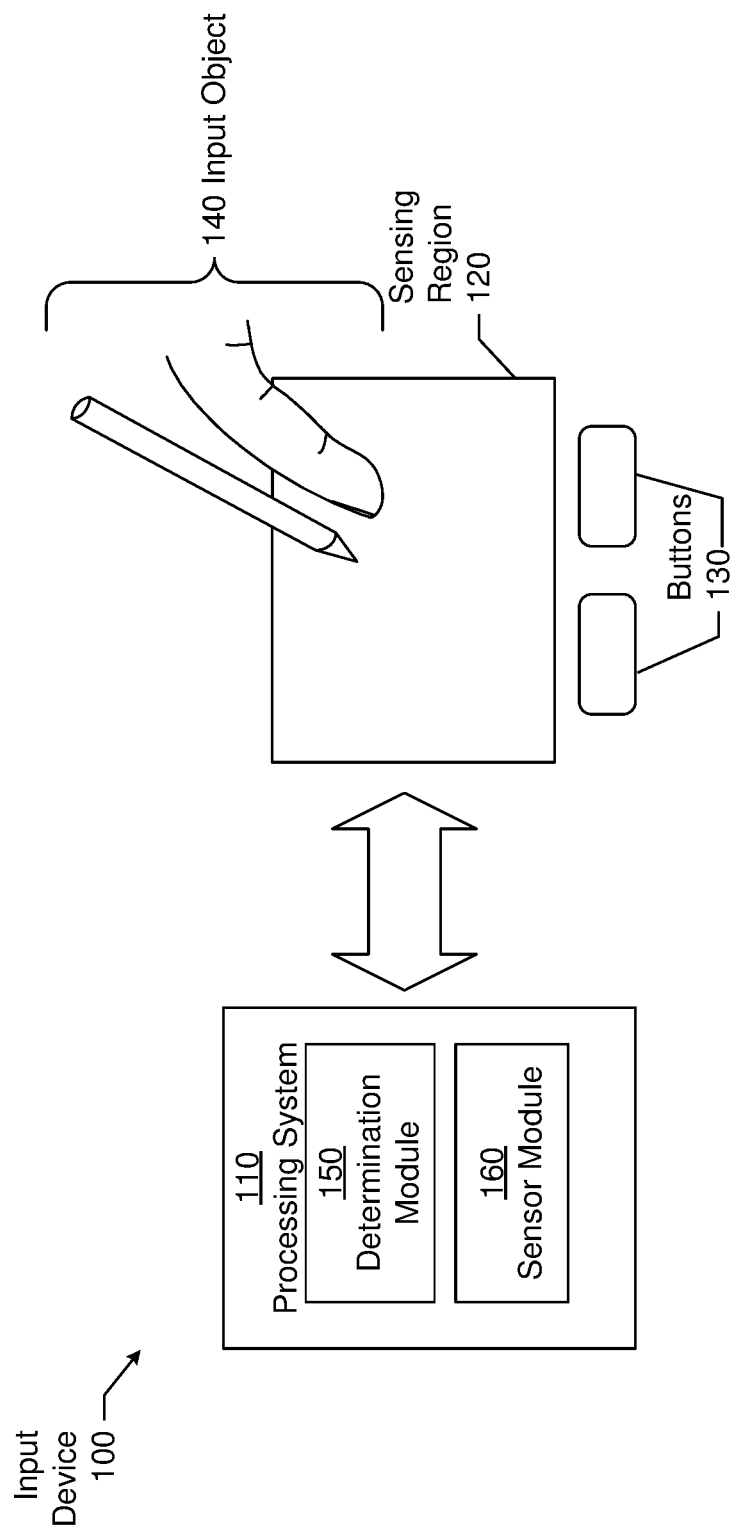
FIG. 1 shows a block diagram of an example system that includes an input device in accordance with one or more embodiments.

Specific embodiments of the disclosed technology will now be described in detail with reference to the accompanying figures. Like elements in the various figures may be denoted by like reference numerals and/or like names for consistency.

The following detailed description is merely exemplary in nature, and is not intended to limit the disclosed technology or the application and uses of the disclosed technology. Furthermore, there is no intention to be bound by any expressed or implied theory presented in the preceding technical field, background, brief summary or the following detailed description.

In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosed technology provide input devices and methods that facilitate improved usability for capacitive imaging. In particular, one or more embodiments of the disclosed technology are directed to providing a method for separating two or more input objects within a capacitive image. Specifically, a capacitive image may include various capacitive pixel values that correspond to respective sensor pixels in a capacitive device. As such, a capacitive pixel value may describe the change in a variable capacitance at a particular sensor pixel in response to one or more input objects, which may be based on respective pixel response function. For example, each input object in a sensing region may provide a capacitive contribution to a particular capacitive pixel value. Likewise, the pixel response function of a particular capacitive pixel may be an expression that identifies the capacitive contributions for different input object locations.

Furthermore, using various pixel response functions, the location of two or more input objects may be estimated within a measured capacitive image. To refine the estimate of the input object locations, a search method may be used that adjusts the input object locations based on one or more comparisons with a measured capacitive image. Where an ideal estimate of the input object locations produces a close match with the capacitive image, poor estimated input object locations may produce capacitive contributions for capacitive pixel values that have a high deviation from the measured capacitive pixel values. In one or more embodiments, for example, the input object locations are updated by the search method until the estimated input object locations produce capacitive contributions that converge to measured capacitive pixel values.

Turning now to the figures, FIG. 1 is a block diagram of an exemplary input device (100) within which the present embodiments may be implemented. The input device (100) includes a processing system (110) and a sensing region (120). The input device (100) may be configured to provide input to an electronic system (not shown for simplicity). An example electronic system (or "electronic devices") may be a system capable of electronically processing information. Non-limiting examples of electronic systems include personal computing devices (e.g., desktop computers, laptop computers, netbook computers, tablets, web browsers, e-book readers, and personal digital assistants (PDAs), composite input devices (e.g., physical keyboards, joysticks, and key switches), data input devices (e.g., remote controls and mice), data output devices (e.g., display screens and printers), remote terminals, kiosks, and video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the corresponding electronic system, or may be physically separated from the electronic system. The input device (100) may be coupled to (and communicate with) components of the electronic system using various wired and/or wireless interconnection and communication technologies, such as buses and networks. Example communication technologies may include Inter-Integrated Circuit (I²C), Serial Peripheral Interface (SPI), PS/2, Universal Serial Bus (USB), Bluetooth®, Infrared Data Association (IrDA), and various radio frequency (RF) communication protocols defined by the IEEE 802.11 and other standards.

In FIG. 1, the input device (100) may correspond to a proximity sensor device (e.g., also referred to as a "touchpad" or a "touch sensor device") configured to sense input provided by one or more input objects (140) in a sensing region (120). Example input objects include fingers, styli, active pen, fingertips, and the like. Throughout the specification, the singular form of input object may be used although multiple input objects may exist in the sensing region (120). Further, the particular input objects in the sensing region may change over the course of one or more gestures.

The sensing region (120) encompasses any space above, around, in, and/or proximate to the input device (100) in which the input device (100) is able to detect user input (e.g., user input provided by one or more input objects (140)). The sizes, shapes, and locations of particular sensing regions may vary depending on actual implementation.

In some embodiments, the sensing region (120) may extend from a surface of the input device (100) in one or more directions into space until signal-to-noise ratio (SNR) of the sensors falls below a threshold suitable for object detection. For example, the distance to which this sensing region (120) extends in a particular direction may be on the order of less than a millimeter, millimeters, centimeters, or more, and may vary with the type of sensing technology used and the accuracy desired. In some embodiments, the sensing region (120) may detect inputs involving no physical contact with any surfaces of the input device (100), contact with an input surface (e.g., a touch surface and/or screen) of the input device (100), contact with an input surface of the input device (100) coupled with some amount of applied force or pressure, and/or a combination thereof. In some embodiments, input surfaces may be provided by, and/or projected on, one or more surfaces of a housing of the input device (100) (e.g., as an image). For example, the sensing region (120) may have a rectangular shape when projected onto an input surface of the input device (100). In some implementations, inputs may be provided through images that span one, two, three, or higher-dimensional spaces in the sensing region (120). In some implementations, inputs may be provided through projections along particular axes or planes in the sensing region (120). Further, in some implementations, inputs may be provided through a combination of one or more images and one or more projections in the sensing region (120).

The input device (100) may utilize any combination of sensor components and sensing technologies to detect user input in the sensing region (120). Example sensing technologies may include capacitive, elastive, resistive, inductive, magnetic, acoustic, ultrasonic, and/or optical sensing technologies.

In some embodiments, the input device (100) may utilize resistive sensing technologies to detect user inputs. For example, the sensing region (120) may be formed by a flexible and conductive first layer, separated by one or more spacer elements, from a conductive second layer. The sensing region (120) may detect user input by creating one or more voltage gradients are created across the layer, and sensing when the first layer is brought in contact with the second layer. More specifically, pressing the flexible first layer may deflect it sufficiently to create electrical contact between the layers, resulting in voltage outputs reflective of the point(s) of contact between the layers. These voltage outputs may be used to determine positional information about the detected inputs.

In some other embodiments, the input device (100) may utilize inductive sensing technologies to detect user inputs. For example, the sensing region (120) may include one or more sensing elements configured to pick up loop currents induced by a resonating coil or pair of coils. The input device (100) may then detect user inputs based on a combination of the magnitude, phase, and/or frequency of the currents. The characteristics of the loop currents may further be used to determine positional information about the detected inputs.

Still further, in some embodiments, the input device (100) may utilize capacitive sensing technologies to detect user inputs. For example, the sensing region (120) may include one or more capacitive sensing elements (e.g., sensor electrodes) to create an electric field. The input device (100) may detect inputs based on changes in capacitance of the sensor electrodes. For example, an object in contact with (or in close proximity to) the electric field may cause changes in the voltage and/or current in the sensor electrodes. Such changes in voltage and/or current may be detected as "signals" indicative of user inputs.

The sensor electrodes may be arranged in arrays or other configurations to detect inputs at multiple points within the sensing region (120). In some implementations, separate sensing electrodes may be ohmically shorted together to form larger sensor electrodes. Some capacitive implementations may utilize resistive sheets that provide a uniform layer of resistance.

Some capacitive implementations utilize "self capacitance" (or "absolute capacitance") sensing methods based on changes in the capacitive coupling between sensor electrodes and an input object. For example, an input object near the sensor electrodes may alter the electric field near the sensor electrodes, thus changing the measured capacitive coupling. In some embodiments, the input device (100) may implement absolute capacitance sensing by modulating sensor electrodes with respect to a reference voltage (e.g., system ground), and detecting the capacitive coupling between the sensor electrodes and input objects. The reference voltage may be a substantially constant voltage or a varying voltage, and in various embodiments, the reference voltage may be system ground. Measurements acquired using absolute capacitance sensing methods may be referred to as absolute capacitive measurements.

Some capacitive implementations utilize "mutual capacitance" (or "transcapacitance") sensing methods based on changes in the capacitive coupling between sensor electrodes. For example, an input object near the sensor electrodes may alter the electric field between the sensor electrodes, thus changing the measured capacitive coupling. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to the receiver sensor electrodes. For example, the transmitter sensor electrodes may be modulated relative to a reference voltage to transmit signals, while the receiver sensor electrodes may be held at a substantially constant voltage to facilitate receipt of resulting signals. The resulting signal received by the receiver sensor electrodes may be affected by environmental interference (e.g., from other electromagnetic signals and/or objects in contact with, or in close proximity to, the sensor electrodes). In some aspects, each sensor electrode may be a dedicated transmitter, a dedicated receiver, or configured to both transmit and receive. Measurements acquired using mutual capacitance sensing methods may be referred to as mutual capacitance measurements.

The processing system (110) may be configured to operate the hardware of the input device (100) to detect input in the sensing region (120). The processing system (110) may include parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) may include electronically-readable instructions, such as firmware code, software code, and/or the like. In some embodiments, components composing the processing system (110) are co-located, for example, in close proximity to the sensing element(s) of the input device (100). In other embodiments, one or more components of the processing system (110) are physically separate from the sensing element(s) of the input device (100). For example, the input device (100) may be a peripheral coupled to a computing device, and the processing system (110) may be implemented as software executed by a central processing unit (CPU) of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators/mechanisms (not shown), etc.

The processing system (110) may be implemented as a set of modules that handle different functions of the processing system (110). Each module may include circuitry that is a part of the processing system (110), firmware, software, and/or a combination thereof. In various embodiments, different combinations of modules may be used. For example, as shown in FIG. 1, the processing system (110)

may include a determination module (150) and a sensor module (160). The determination module (150) may be configured to determine when at least one input object is in a sensing region, determine signal to noise ratio, determine positional information of an input object, identify a gesture, determine an action to perform based on the gesture, a combination of gestures or other information, and/or perform other operations.

The sensor module (160) may be configured to drive the sensing elements to transmit transmitter signals and receive the resulting signals. For example, the sensor module (160) may include sensor circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

The processing system (110) may include alternative or additional modules corresponding to distinct modules or sub-modules of one or more of the modules discussed above. For example, alternative or additional modules may include hardware operation modules configured to operate hardware such as sensor electrodes and display screens, data processing modules configured to process data such as sensor signals and positional information, reporting modules configured to report information, identification modules configured to identify gestures such as mode changing gestures, and mode changing modules configured to change operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

The processing system (110) may operate the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes and/or perform filtering or other signal conditioning on the received signals. In some embodiments, the processing system (110) may subtract or otherwise account for a baseline associated with the sensor electrodes. For example, the baseline may represent a state of the sensor electrodes when no user input is detected. Accordingly, the information provided by the processing system (110) to the electronic system may reflect a difference between the electrical signals received from the sensor electrodes and the baseline associated with each sensor electrode. In some embodiments, the processing system (110) may determine positional information for detected input, recognize inputs as commands, recognize handwriting, and the like.

The term "positional information" as used herein refers to any information describing other otherwise indicating a position or location of the detected input (e.g., within the sensing region (120)). Example positional information includes absolute position, relative position, velocity, acceleration, and/or other types of spatial information. The term "zero-dimensional" positional information may include how near/far an object is to the sensing region (120), or whether or not the object is in contact with the sensing region (120). The term "one-dimensional" positional information refers to information describing a position of the detected input along a particular axis. The term "two-dimensional" positional information refers to information describing a position or motion of the detected input in a plane. The term "three-dimensional" positional information refers to information describing a position, or instantaneous or average velocities of the detected input in space. Further examples of positional information may include other representations of spatial information, for example, historical data tracking position, movement, or instantaneous velocity of the detected input over time.

In some embodiments, the input device (100) includes a touch screen interface (e.g., display screen) that at least partially overlaps the sensing region (120). For example, the sensor electrodes of the input device (100) may form a substantially transparent overlay on the display screen, thereby providing a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, one or more of the sensor electrodes may be configured for both display updating and input sensing.

While FIG. 1 shows a configuration of components, other configurations may be used without departing from the scope of the disclosure. For example, various components may be combined to create a single component. As another example, the functionality performed by a single component may be performed by two or more components. Accordingly, for at least the above-recited reasons, embodiments of the disclosure should not be considered limited to the specific arrangements of components and/or elements shown in FIG. 1.

Figure 2A:
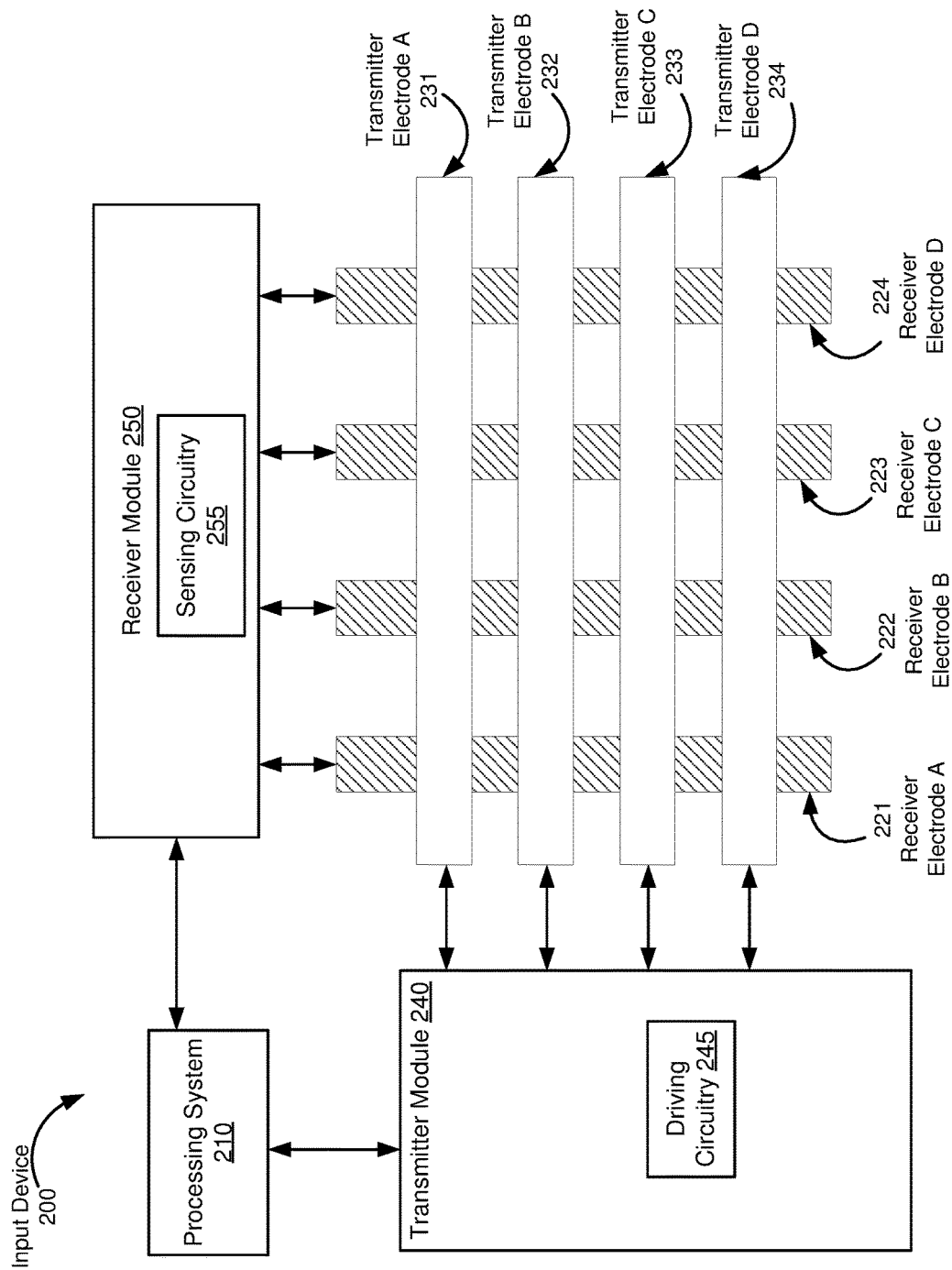
FIG. 2A shows a schematic view of an input device in accordance with one or more embodiments.

Turning to FIG. 2A, FIG. 2A shows a schematic view of an input device (200) in accordance with one or more embodiments. As shown in FIG. 2A, the input device (200) may include a receiver module (250), a transmitter module (240), and a processing system (210). The processing system (210) may be similar to processing system (110) described in FIG. 1 and the accompanying description and/or computing system (600) described in FIG. 6 and the accompanying description. The transmitter module (240) may include driving circuitry (245) that may be similar to transmitter circuitry described in FIG. 1 and the accompanying description. For example, driving circuitry (245) may include hardware and/or software that are configured to generate one or more sensing signals transmitted over one or more transmitter electrodes (e.g., transmitter electrode A (231), transmitter electrode B (232), transmitter electrode C (233), transmitter electrode D (234)). The transmitter electrodes (231, 232, 233, 234) may be similar to the transmitter electrodes described in FIG. 1 and the accompanying description.

Moreover, the receiver module (250) may include sensing circuitry (255). For example, sensing circuitry (255) may include hardware and/or software that are configured to obtain one or more resulting signals from one or more receiver electrodes (e.g., receiver electrode A (221), receiver electrode B (222), receiver electrode C (223), receiver electrode D (224)) in response to one or more sensing signals transmitted over the transmitter electrodes (231, 232, 233, 234). The sensing circuitry (255) may be similar to the receiver circuitry described in FIG. 1 and the accompanying description. In particular, the sensing circuitry (255) may include analog-front ends, which may further include various analog conditioning circuitry, such as operational amplifiers, digital-signal processing components, filters, and various application-specific integrated circuits for detecting and analyzing resulting signals obtained from the receiver electrodes (221, 222, 223, 224). Likewise, the receiver electrodes (221, 222, 223, 224) may be similar to the receiver electrodes described in FIG. 1 and the accompanying description.

Figure 2B:
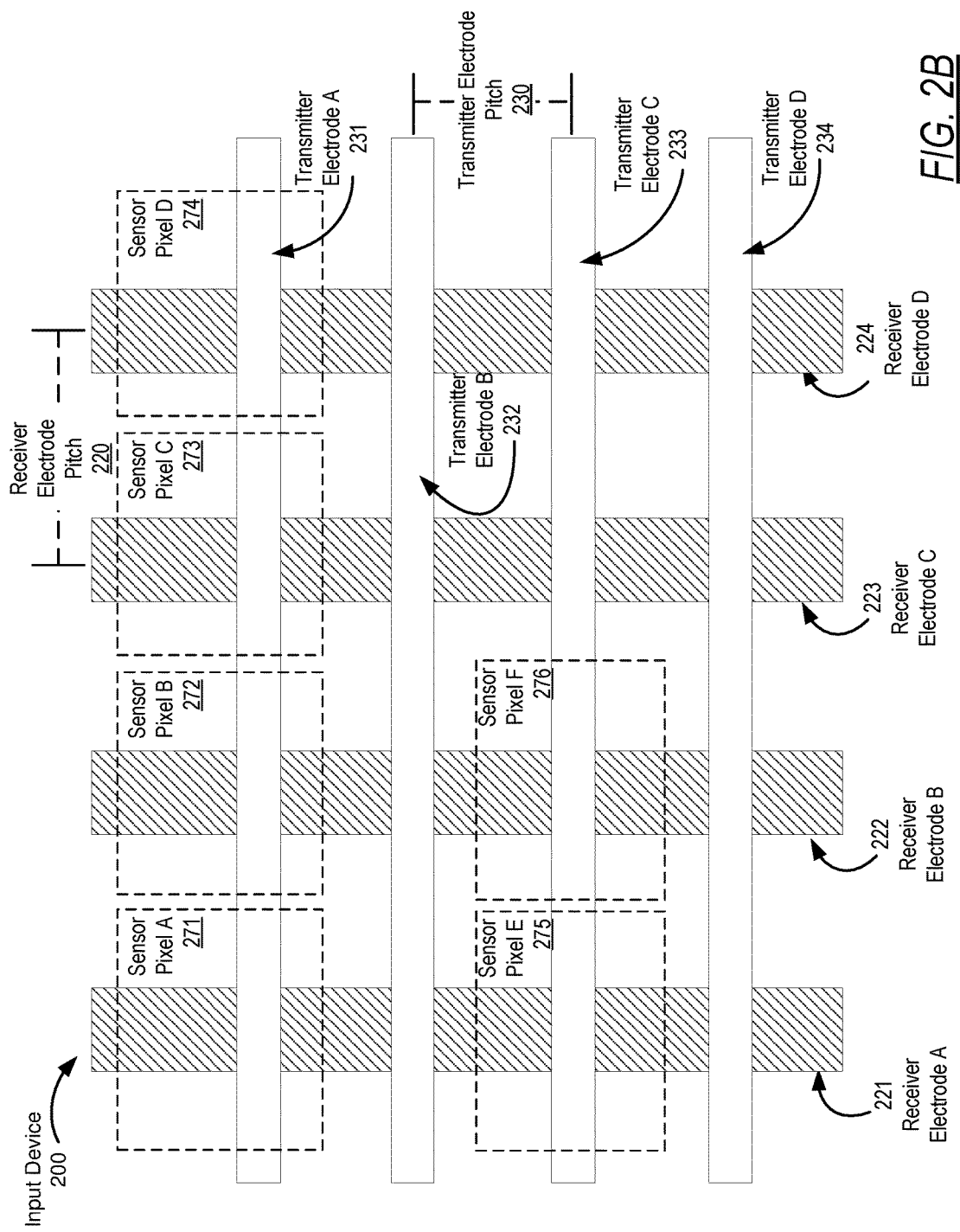
FIG. 2B shows a schematic view of an input device in accordance with one or more embodiments.

Turning to FIG. 2B, FIG. 2B shows a schematic view of an input device (200) in accordance with one or more embodiments. As shown in FIG. 2B, various sensor pixels (i.e., sensor pixel A (271), sensor pixel A (271), sensor pixel B (272), sensor pixel C (273), sensor pixel D (274), sensor pixel E (275), sensor pixel F (276)) are disposed in the input device (200). In particular, a sensor pixel may be a portion of a physical sensor in an input device where a capacitive measurement is obtained, e.g., by sensing circuitry. For example, sensor pixels may be located at various intersections of receiver electrodes (e.g., receiver electrode A (221), receiver electrode B (222), receiver electrode C (223), receiver electrode D (224)) and transmitter electrodes (e.g., transmitter electrode A (231), transmitter electrode B (232), transmitter electrode C (233), transmitter electrode D (234)). In particular, the transmitter electrodes (231, 232, 233, 234) may be separated by a transmitter electrode pitch (230) that defines a particular spacing between respective transmitter electrodes. Likewise, the receiver electrodes (221, 222, 223, 224) may be separated by a receiver electrode pitch (220) that defines a particular spacing between respective transmitter electrodes. However, other embodiments are contemplated where sensor pixels do not correspond to intersections of transmitter electrodes and receiver electrodes.

In some embodiments, for example, an input device may include sensor electrodes that are disposed in a matrix array (also called an "Advanced Matrix Pad" or AMP) where each sensor electrode may be referred to as a matrix sensor electrode. As such, each sensor electrode of the matrix array may correspond to a sensor pixel for a capacitive image. Further, two or more sensor electrodes of the matrix array may correspond to a sensor pixel of a capacitive image. As such, sensor pixels may be arranged in a grid and/or a non-grid manner within an input device.

Figure 3:
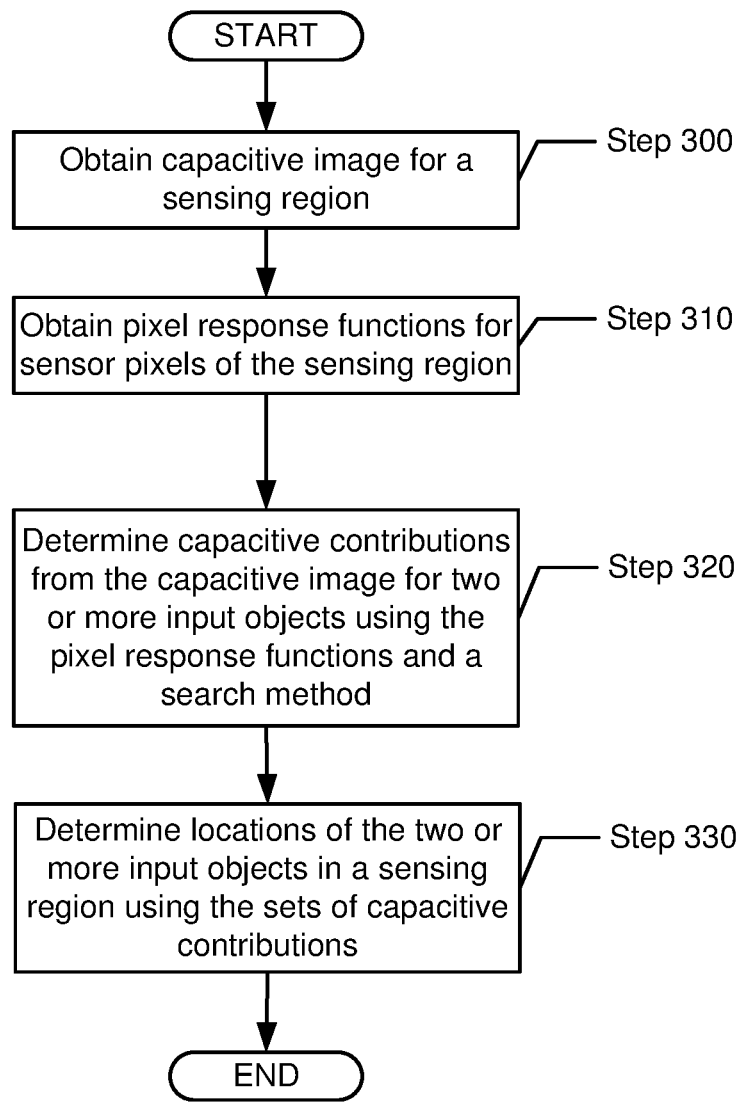
FIG. 3 shows a flowchart illustrating a method for distinguishing two or more input objects within a capacitive image in accordance with one or more embodiments.

FIG. 3 shows a flowchart illustrating a method for distinguishing two or more input objects within a capacitive image in accordance with one or more embodiments. The process shown in FIG. 3 may involve, for example, one or more components discussed above in reference to FIGS. 1, 2A, and 2B (e.g., processing system (110)). While the various steps in FIG. 3 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, a capacitive image is obtained for a sensing region in accordance with one or more embodiments. In particular, the capacitive image may include various capacitive pixel values corresponding to respective sensor pixels in an input device. In one or more embodiments, for example, the capacitive pixel values in the capacitive image are absolute capacitive measurements of a variable capacitance generated in response to two or more input objects in a sensing region of an input device. In some embodiments, the capacitive image may be obtained from various resulting signals that are obtained by sensing circuitry from various receiver electrodes as described in FIGS. 1, 2A, 2B, and the accompanying description.

In Step 310, various pixel response functions are obtained for various sensor pixels of a sensing region in accordance with one or more embodiments. In one or more embodiments, a pixel response function (PRF) describes a change in variable capacitance at a particular sensor pixel for a predetermined input object size and location in a sensing region. For example, a pixel response function may be the a priori response to a specific type of input object, e.g., a finger of a specific size, while a pixel response may refer to the cumulative signal at a sensor pixel from all input objects present in a sensing region. In some embodiments, a pixel response function may be a mathematical expression that describes the amplitude of a capacitive pixel value using a location of one or more input objects in a sensing region and a particular statistical distribution. For example, a single input object in a sensing region may produce a capacitive response that resembles a Gaussian distribution, a Gamma distribution, a Weibull distribution, or other predetermined statistical distribution based on the physical design of an input device. Depending on the statistical distribution associated with a pixel response function, different capacitive images are produced based on different locations of one or more input objects in the sensing region.

In one or more embodiments, a pixel response function is expressed using the following equation:

$$PRF(x,y,\alpha_k)=A_i \qquad \text{Equation 1}$$

where $A_i$ is an amplitude of a capacitive pixel value for an $i^{th}$ sensor pixel; x is a distance that an input object is offset in the x-axis from a sensor pixel of an input device; y is a distance that the input object is offset in the y-axis from the sensor pixel; and $\alpha_k$ are parameters describing the statistical distribution of the capacitive response produced by the input object at the sensor pixel. For example, the $\alpha_k$ parameters may describe a Gaussian distribution that includes a representative peak pixel value, the largest amplitude value, and the standard deviations of the Gaussian distribution along the x-axis and y-axis. As such, for an input device with sensor pixels corresponding to a canonical rectangular sensor with $N_{Tx}$ transmitter electrodes and $N_{Rx}$ receiver electrodes, the Cartesian coordinates of the center of each sensor pixel (i,j), where $i \in \{1, \ldots, N_{Tx}\}$ and $j \in \{1, \ldots, N_{Rx}\}$, may be expressed using the following equation:

$$\text{Sensor Pixel}(x, y) = \left(\left(j-\frac{1}{2}\right)p_{Rx}, \left(i-\frac{1}{2}\right)p_{Tx}\right) \qquad \text{Equation 2}$$

where x is the distance an input object is offset from a sensor pixel of an input device in the x-axis; y is the distance the input object is offset from the sensor pixel in the y-axis; j is the corresponding receiver electrode of the sensor pixel; i is the corresponding transmitter electrode of the sensor pixel; $p_{Rx}$ is the corresponding receiver electrode pitch in the receiver electrode dimension within the input device; and $p_{Tx}$ is the corresponding transmitter electrode pitch in the transmitter electrode dimension within the input device.

In one or more embodiments, pixel response functions are determined for a non-grid input device. For example, once an input device is characterized for different inputs, e.g., capacitive responses are measured for input objects of different sizes and at different locations, a library of pixel response functions may be determined for multiple input objects. In particular, the library may include pixel response functions that produce a "best fit" for multiple input objects. Non-grid input devices may have non-linear responses versus object size and location relative to a particular sensor pixel, which may produce pixel response functions that are more computationally intensive and possibly unstable. Likewise, in one or more embodiments, for a grid input device, a single pixel response function may be used for each sensor pixel.

Accordingly, a capacitive pixel value for the $i^{th}$ and $j^{th}$ sensor pixel may be expressed for a single input object in a sensing region of an input device using the following equation:

$$A_{ij} = PRF\left(x_1 - \left(j - \frac{1}{2}\right)p_{Rx}, y_1 - \left(i - \frac{1}{2}\right)p_{Tx}, \alpha_k\right) \quad \text{Equation 3}$$

where $A_{ij}$ is an amplitude of a capacitive pixel value for an $i^{th}$ and $j^{th}$ sensor pixel; j is the corresponding receiver electrode of the corresponding sensor pixel; i is the corresponding transmitter electrode of the corresponding sensor pixel; $x_1$ is the location of an input object in the sensing region along the x-axis; $y_1$ is the location of an input object in the sensing region along the y-axis; $p_{Rx}$ is the corresponding receiver electrode pitch in the receiver electrode dimension within the input device; $p_{Tx}$ is the corresponding transmitter electrode pitch in the transmitter electrode dimension within the input device; and $\alpha_k$ are parameters describing the statistical distribution of the capacitive response produced by the input object at the corresponding sensor pixel.

In one or more embodiments, where multiple input objects are located in a sensing region of an input device, a capacitive pixel value for the $i^{th}$ and $j^{th}$ sensor pixel may be expressed using the following equation:

$$A_{ij} = \sum_n PRF\left(x_n - \left(j - \frac{1}{2}\right)p_{Rx}, y_n - \left(i - \frac{1}{2}\right)p_{Tx}, \alpha_k\right) \quad \text{Equation 4}$$

where $A_{ij}$ is an amplitude of a capacitive pixel value for an $i^{th}$ and $j^{th}$ sensor pixel; j is the corresponding receiver electrode of the corresponding sensor pixel; i is the corresponding transmitter electrode of the corresponding sensor pixel; n is the number of input objects in the sensing region; $x_n$ is the location of the $n^{th}$ input object in the sensing region along the x-axis; $y_n$ is the location of the $n^{th}$ input object in the sensing region along the y-axis; $p_{Rx}$ is the corresponding receiver electrode pitch in the receiver electrode dimension within the input device; $p_{Tx}$ is the corresponding transmitter electrode pitch in the transmitter electrode dimension within the input device; and $\alpha_k$ are parameters describing the statistical distribution of the capacitive response produced by n input objects at the corresponding sensor pixel.

Keeping with Equation 4, Equation 4 may determine capacitive pixel values for various sensor pixels if one or more of the following conditions are met: condition 1) the aggregate amplitudes of each pixel is less than the saturation capacitance of the input device; condition 2) the input objects are substantially similar in size or their size is known or reasonably determined, e.g., a finger and a stylus; and condition 3) the number of n input objects and the sensor pixels do not alter the physical geometry of the input device such that sufficient correlation remains between the coefficients of capacitance for the input objects and each sensor pixel. For example, condition 1 may be satisfied by increasing the pitch size for receiver electrodes and transmitter electrodes. Likewise, larger relative receiver electrode pitch and transmitter electrode pitch may satisfy condition 1 for smaller input objects. Condition 2 may be satisfied where similar pixel response functions can be applied to each input object in the sensing region. Condition 3 may be satisfied where the amplitude of a capacitive pixel value at a sensor pixel may be analyzed as a linear summation of the capacitive contribution of each input object in the sensing region of an input device.

In Step 320, various sets of capacitive contributions are determined from a capacitive image for two or more input objects using various pixel response functions and a search method in accordance with one or more embodiments. Using the capacitive image obtained in Step 300 and the pixel response functions obtained in Step 310, for example, a processing system may compute two or more sets of capacitive contributions for each input object in the sensing region. In one or more embodiments, for example, if the measured capacitive image from Step 300 is generated by two fingers, a processing system computes a separate capacitive image for each finger where the separate capacitive images describe the capacitive response without any capacitive contributions from the other finger.

With regard to the search method, the search method may be an iterative solver to determine various computed images that provide a solution to the pixel response functions from Step 310. For example, the iterative matrix-solver may be a Newton-Raphson iterative matrix-solver. As such, the capacitive pixel values of the capacitive image from Step 300 may be iteratively updated using the pixel response functions from Step 310.

In one or more embodiments, for example, where two input objects, e.g., an input object A and an input object B, are located in a sensing region, the predicted capacitive images may be obtained using the following equation:

$$A_{ij} = \frac{A_{PRF} \cdot \left( e^{-\frac{1}{2}\left(\left(\frac{x_1 - (j - \frac{1}{2})p_x}{\sigma_x}\right)^2 + \left(\frac{y_1 - (i - \frac{1}{2})p_y}{\sigma_y}\right)^2\right)} + e^{-\frac{1}{2}\left(\left(\frac{x_2 - (j - \frac{1}{2})p_x}{\sigma_x}\right)^2 + \left(\frac{y_2 - (i - \frac{1}{2})p_y}{\sigma_y}\right)^2\right)} \right)}{2\pi\sigma_x\sigma_y} \quad \text{Equation 5}$$

where $A_{ij}$ is an amplitude of a capacitive pixel value in the capacitive image for an $i^{th}$ and $j^{th}$ sensor pixel; j is the corresponding receiver electrode of the corresponding sensor pixel; i is the corresponding transmitter electrode of the corresponding sensor pixel; $x_1$ is the location of the input object A in the sensing region along the x-axis; $y_1$ is the location of the input object A in the sensing region along the y-axis; $x_2$ is the location of the input object B in the sensing region along the x-axis; $y_2$ is the location of the input object B in the sensing region along the y-axis; $p_x$ is the corresponding receiver electrode pitch in the receiver electrode dimension within the input device; $p_y$ is the corresponding transmitter electrode pitch in the transmitter electrode dimension within the input device; $A_{PRF}$ is the amplitude of the pixel response function at the $i^{th}$ and $j^{th}$ sensor pixel; $\sigma_x$ is the fitted Gaussian width in the x-axis; and $\sigma_y$ is the fitted Gaussian width in the y-axis. Specifically, a particular search method may solve Equation 5 or another equation based on a pixel response function for values of $x_1$, $x_2$, $y_1$, and/or $y_2$ for the locations of input object A and/or input object B in the sensing region. With respect to the capacitive contributions of input object A and input object B, the capacitive contributions may be expressed with the following equations:

$$\text{Capacitive Contribution of Input Object } A = A_{ij} e^{-\frac{1}{2}\left(\left(\frac{x_1-(j-\frac{1}{2})p_x}{\sigma_x}\right)^2 + \left(\frac{y_1-(i-\frac{1}{2})p_y}{\sigma_y}\right)^2\right)} \quad \text{Equation 6}$$

$$\text{Capacitive Contribution of Input Object } B = A_{ij} e^{-\frac{1}{2}\left(\left(\frac{x_2-(j-\frac{1}{2})p_x}{\sigma_x}\right)^2 + \left(\frac{y_2-(i-\frac{1}{2})p_y}{\sigma_y}\right)^2\right)} \quad \text{Equation 7}$$

In Step 330, various locations of two or more input objects are determined in a sensing region using various sets of capacitive contributions in accordance with one or more embodiments. Based on the capacitive contributions obtained in Step 320, locations of the two or more input objects may be separated within the capacitive image from Step 300. For example, a computed solution to a measured capacitive image and various pixel response functions may isolate two or more peak pixel values within the capacitive image that corresponding to each input object. In one or more embodiments, for example, two input objects are identified within a capacitive image in Step 330 where only a single capacitive peak exists in the capacitive image.

Furthermore, the method described in FIG. 3 may provide improved techniques in distinguishing between two or more input objects in near proximity. For example, a processing system may determine the locations of three input objects in Step 330, and thus report three input objects to a host device. In contrast, where the proximity of two input objects in a sensing region are below a minimum resolvable separation distance, the two input objects may be identified as a single input object. In one or more embodiments, the locations of the two or more input object in Step 330 identify a "pinch" gesture and/or a "separation" gestures by a processing system. For example, "pinch" gestures and/or "separation" gestures may be used to resize windows and images within a graphical user interface. In particular, the method described in FIG. 3 may distinguish the locations of input objects in a sensing region where the receiver electrode pitch and/or the transmitter electrode pitch are larger than various image frame processing algorithms may require for determining distinct input object peaks in a measured capacitive image. For example, minimum finger separation may be improved by decreasing the receiver electrode pitch and/or the transmitter electrode pitch. However, for large touchscreens (LTS), reducing electrode pitch may exceed the allowable number of sensing channels and/or processing capacity of a processing system.

Likewise, the thickness of an input surface (e.g., a coverglass layer above a touch-sensitive display) on an input device may contribute to resolution blurring among sensor pixels in the input device. Accordingly, the method of FIG. 3 may mitigate a portion of the resolution blurring.

Figure 4:
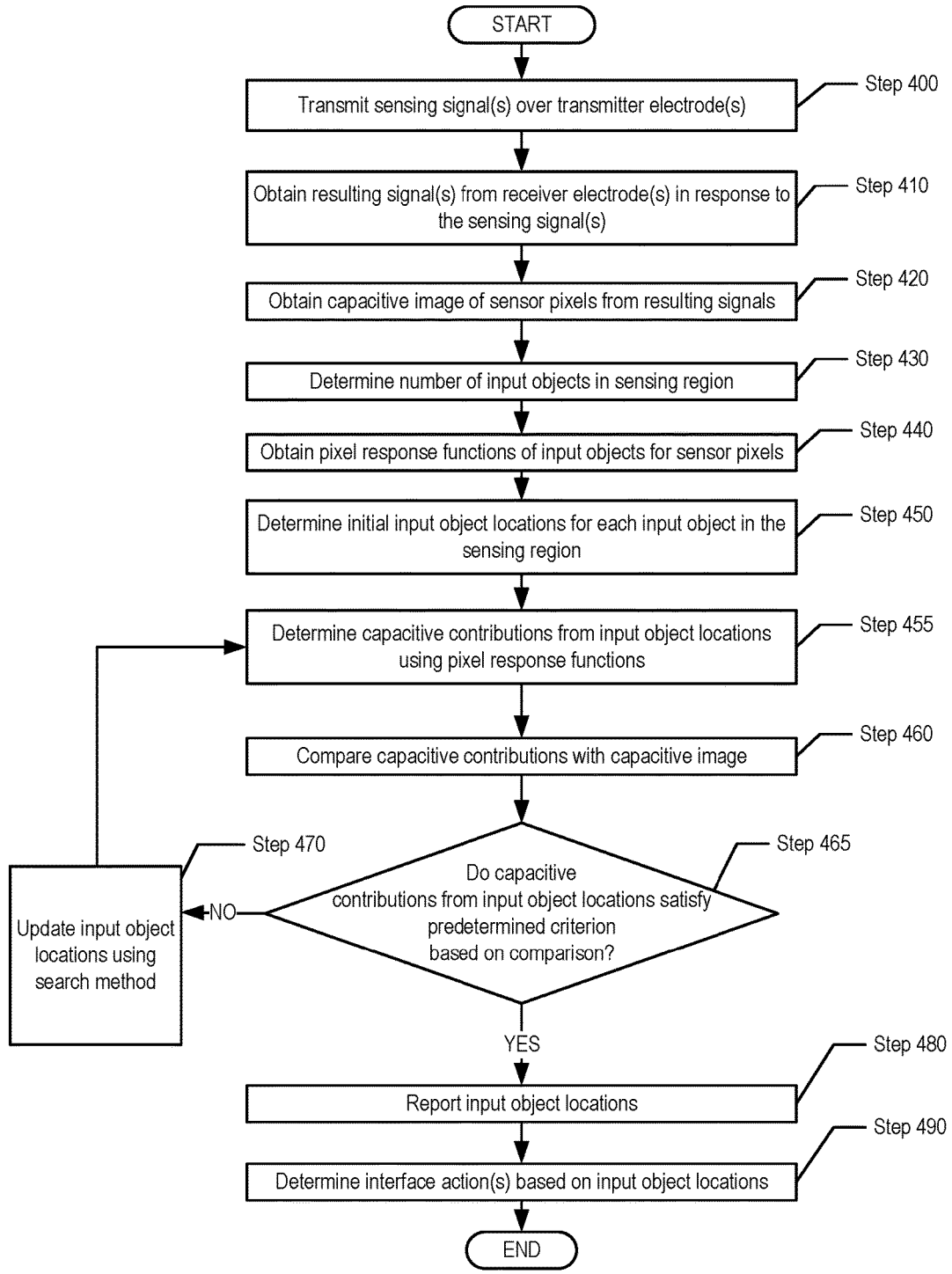
FIG. 4 shows a flowchart illustrating a method for operating an input device in accordance with one or more embodiments.

Turning to FIG. 4, FIG. 4 shows a flowchart illustrating a method for operating an input device in accordance with one or more embodiments. The process shown in FIG. 4 may involve, for example, one or more components discussed above in reference to FIGS. 1, 2A, and 2B (e.g., processing system (110)). While the various steps in FIG. 4 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, one or more sensing signals are transmitted over one or more transmitter electrodes in accordance with one or more embodiments. The transmitter electrodes may be similar to the transmitter electrodes described in FIGS. 1, 2A, 2B and the accompanying description.

In Step 410, one or more resulting signals are obtained from one or more receiver electrodes in response to one or more sensing signals in accordance with one or more embodiments. The receiver electrodes may be similar to the receiver electrodes described in FIGS. 1, 2A, 2B and the accompanying description.

In Step 420, a capacitive image of sensor pixels for a sensing region is obtained from various resulting signals in accordance with one or more embodiments. For example, a processing system can use the resulting signals obtained in Step 410 to generate a capacitive image representing changes in variable capacitance due to one or more input objects in the sensing region. The obtained capacitive image may be similar to the capacitive image obtained in Step 300 described above in FIG. 3 and the accompanying description.

In Step 430, a number of input objects in a sensing region is determined in accordance with one or more embodiments. For example, the number of input objects may be determined based, at least in part, on whether the total capacitive response of a capacitive image, i.e., a summation of the changes in capacitances at each sensor pixel in an input device, is above a predetermined threshold. In particular, where two or more input objects are located in a sensing region, a total capacitive pixel response may describe a larger change in variable capacitance than a total capacitive response of a single input object in the sensing region. In some embodiments, a processing system may analyze a capacitive peak within the capacitive image. For example, a single finger capacitive response may be 88 femptofarads (fF), while a capacitive image that detects two fingers may have a peak of 96.6 fF. Thus, a capacitive peak, i.e., the capacitive pixel value with the largest change in capacitance, in the capacitive image may be analyzed by the processing system to determine whether more than one input object is present in the sensing region.

In Step 440, various pixel response functions are obtained for various sensor pixels in accordance with one or more embodiments. For example, pixel response functions may be determined as an initial sensor characterization of an input device prior to the start of the processes described in FIGS. 3 and 4. Accordingly, a processing system may then access and/or use predetermined pixel response functions that are stored in the input device. Step 440 may be similar to Step 310 above and the accompanying description. Different pixel response functions may be used in Steps 450-460 below depending on the number of input objects determined in Step 430. As such, different pixel response functions, e.g., different equations, may be used for different numbers of input objects in the sensing region.

Furthermore, in some embodiments, the pixel response functions are obtained and/or capacitive contributions are calculated without knowing the number of input objects in the sensing region, i.e., without performing Step 430. For example, a processing system may perform calculations for both a single finger in the sensing region and two fingers in the sensing region. The computed capacitive contributions with the lesser least square error may be selected accordingly. Likewise, where Equation 5 is used to compute the capacitive contributions, input object locations and/or a recomputed predicted capacitive image, Equation 5 may be changed according to the number of input objects predicted in the sensing region.

In Step 450, initial input object locations are determined in accordance with one or more embodiments. Initial input object locations may simply be the starting guess in predicting the actual input object locations in a sensing region. In particular, the initial input object locations may be default positions within a sensing region, e.g., the same default positions for any measured capacitive image. Where the initial input object locations are based on a measured capacitive image, for example, a single capacitive peak may be identified to determine one or more initial input object locations. In some embodiments, one initial input object location may have a particular offset in the x-direction and/or y-direction from the single capacitive peak, while another initial input object location may have a different offset in the x-direction and/or y-direction from the single capacitive peak.

In Step 455, capacitive contributions from input object locations are determined using various pixel response functions in accordance with one or more embodiments. For example, capacitive contributions may be computed and/or recomputed for all or a portion of the capacitive pixel values in a capacitive image using different input object locations. In particular, the capacitive contribution of a particular input object may be the amount of change in capacitance at a particular sensor pixel due to a single input object at a particular location. As such, a capacitive pixel value for a particular sensor pixel may be the resulting summation of the capacitive contributions for multiple input objects.

To illustrate Step 455, in some embodiments, a capacitive pixel value is constant, i.e., the capacitive pixel value is the measured value by the input device at a sensor pixel. Thus, based on different guesses of input object locations, a capacitive pixel value may have different distributions of the capacitive contributions for each input object. For example, if input object A is located at position X, then its capacitive contribution may be 35% of the total amplitude of the capacitive pixel value. On the other hand, in another iteration of Step 455, input object A may be estimated to be located at position Y. At position Y, input object A's predicted capacitive contribution may be 45% of the total amplitude of the capacitive pixel value.

If two input objects are present in a sensing region, the capacitive contributions from the two input objects may be determined by using the locations of the input objects (i.e., $x_1$, $x_2$, $y_1$, and $y_2$) as determined in Step 450 or Step 470 as inputs to Equations 4 or 5. For three or more input objects, corresponding equations and/or pixel response functions may be used to compute the capacitive contribution for each respective input object at a particular sensor pixel.

In Step 460, capacitive contributions are compared with a capacitive image in accordance with one or more embodiments. In particular, the capacitive contributions at a particular sensor pixel may be used to determine a calculated capacitive pixel value, e.g., the result of Equation 5 above. In comparing capacitive contributions, for example, calculated capacitive pixel values may be analyzed in relation to the capacitive image from Step 420. The calculated capacitive pixel values may be analyzed discretely, or combined into a predicted capacitive image for comparison with a measured capacitive image. For example, a particular set of input object locations may provide a close match with the measured capacitive image at one capacitive pixel value but a poor match with a different capacitive pixel value in the measured capacitive image. When the input object locations determined in Step 450 or Step 470 match the actual input object locations that generated the capacitive image, the difference between measured values and predicted values may be small. On the other hand, where the difference between measured values and predicted values are outside a predetermined range, the input object locations may require an adjustment.

In one or more embodiments, previous iterations of Steps 455-470 are analyzed for whether the predicted input object locations are getting closer or further away from the actual input object locations. For example, a comparison may involve comparing the difference between a capacitive image predicted using the input object locations from Step 450 and/or Step 470 and the measured capacitive image from Step 420. Moreover, the comparison between a predicted capacitive image and a measured capacitive image may be performed using any suitable methods.

In Step 465, a determination is made whether capacitive contributions from input object locations satisfy a predetermined criterion based on a comparison in accordance with one or more embodiments. In particular, the comparison may be the comparison performed in Step 460. Likewise, the comparison may include one or more comparisons from a previous iteration of Steps 450-470 in FIG. 4. Furthermore, the predetermined criterion may be a convergence criterion, such that the difference between a predicted capacitive image using the capacitive contributions with a particular input object location is within a certain standard deviation or amount of error with respect to the capacitive image obtained in Step 420. In another embodiment, a designated number of updates to the input object locations may be performed at Step 470 below before classifying the capacitive contributions as satisfying the predetermined criterion. In response to a determination that the capacitive contributions from the input object locations satisfy the predetermined criterion, the process proceeds to Step 480. In response to a determination that the capacitive contributions fail to satisfy the predetermined criterion, the process proceeds to Step 470.

In Step 470, various input object locations are updated using a search method in accordance with one or more embodiments. In particular, the search method may incrementally update the locations of one or more input objects based for example, on one or more previous comparisons between the capacitive contributions and the measured capacitive image. If the difference between the values of the capacitive contributions and the measured capacitive image is increasing, the search method may switch directions, e.g., from increasing a value to decreasing a value, of the adjusted input object locations. For example, if moving the location of an input object in one direction along the x-axis increases the difference, then the search method may move the input object in the opposite direction along the x-axis. Likewise, the search method may be similar to the search method described in Step 320 of FIG. 3 and the accompanying description.

Figure 5A:
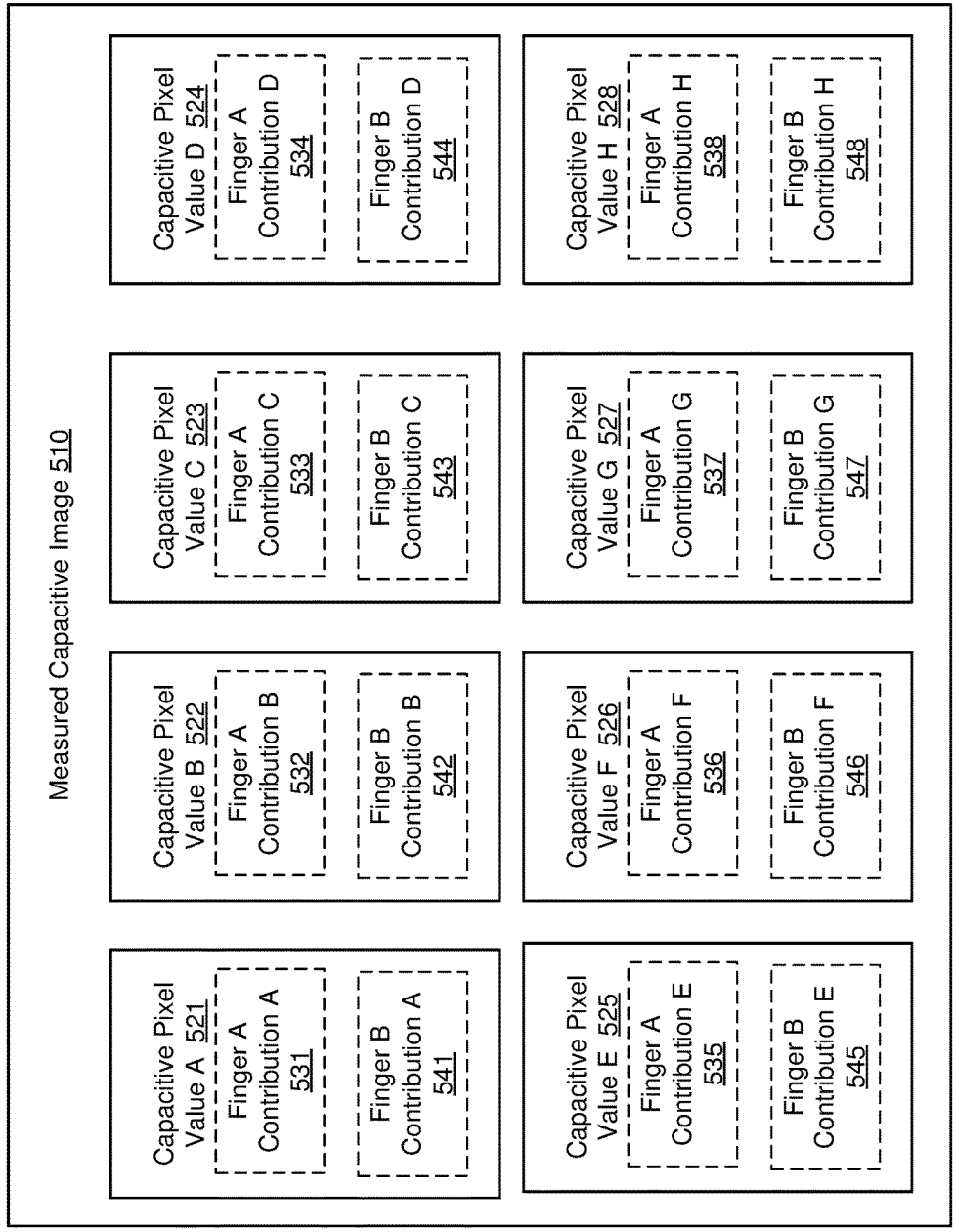
FIG. 5A shows an example measured capacitive image in accordance with one or more embodiments.
Figure 5B:
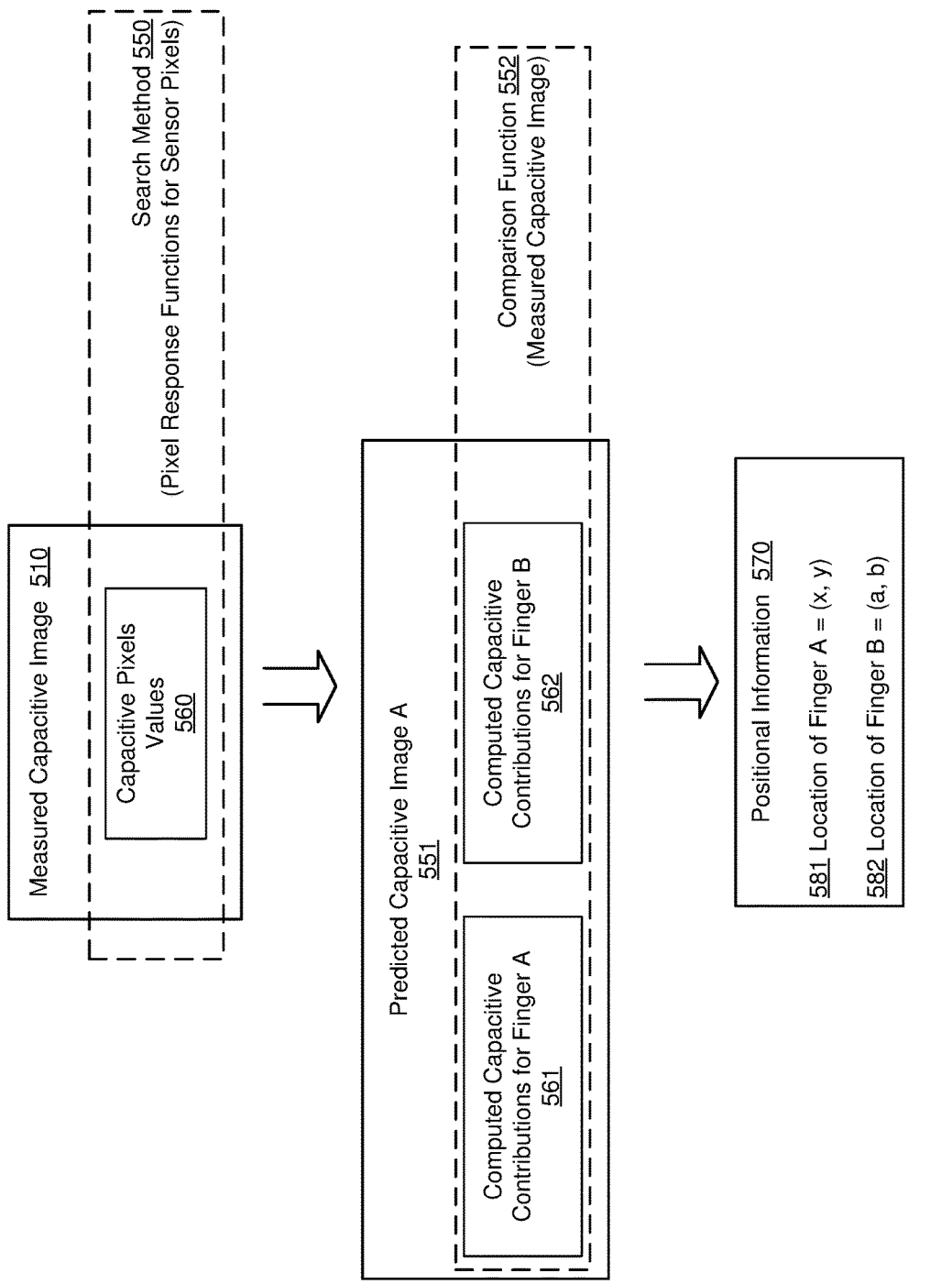
FIG. 5B shows an example of determining multiple input object locations from a capacitive image in accordance with one or more embodiments.

FIGS. 5A and 5B provide examples of computing multiple input object locations from a capacitive image. In particular, FIGS. 5A and 5B may be an example of Steps 455, 460, 465, and 470 described above. The following example is for explanatory purposes only and not intended to limit the scope of the disclosed technology.

FIG. 5A shows a measured capacitive image (510) obtained using an input device. The measured capacitive image (510) may include various capacitive pixel values (i.e., capacitive pixel value A (521), capacitive pixel value B (522), capacitive pixel value C (523), capacitive pixel value D (524), capacitive pixel value E (525), capacitive pixel value F (526), capacitive pixel value G (527), and capacitive pixel value H (528)) produced in response to a finger A (not shown) and a finger B (not shown) located in a sensing region of the input device. Each capacitive pixel value may be modeled as a superposition of individual finger capacitance contributions. For example, capacitive pixel value A (521) includes a contribution A (531) from finger A and a contribution A (541) from finger B. Thus, various capacitive contributions (531, 532, 533, 534, 534, 536, 537, 538, 541, 542, 543, 544, 545, 546, 547, 548) can combine to form the measured capacitive image (510).

FIG. 5B illustrates a search method (550) performed on capacitive pixel values (560) of the measured capacitive image (510). In particular, using pixel response functions for various sensor pixels in an input device (not shown), the search method (550) determines a predicted capacitive image A (551) for finger A and finger B. The predicted capacitive image A (551) includes computed capacitive contributions for finger A (561) and computed capacitive contributions for finger B (562).

Keeping with FIG. 5B, a comparison function (552) may then analyze the predicted capacitive image A (551) with respect to the measured capacitive image (510). The comparison function (552) may be similar to Steps 460 and 465 in FIG. 4. If the predicted capacitive image A (551) is within a predetermined deviation of the measured capacitive image (510), positional information (570) is determined for each finger in the sensing region, i.e., a location of finger A (581) and a location of finger B (582). The location of finger A (581) and/or the location of finger B (582) may be reported to a host device in order to determine whether to perform one or more interface actions in a graphical user interface. If the comparison function (552) determines that the predicted capacitive image A (551) is outside the desired deviation from the measured capacitive image (510), the comparison function (552) may trigger the search method (550) to update the input object locations to produce new computed capacitive contributions and a different predicted capacitive image.

Returning to FIG. 4, in Step 480, various input object locations are reported in accordance with one or more embodiments. For example, a processing system may determine the input object locations using the capacitive contributions that satisfy the predetermined criterion. The processing system may then report the input object locations to a host device coupled to the processing system. For example, the host device may be similar to the computing system described in FIG. 6 and the accompanying description. Likewise, the input object locations may be reported as positional information for respective input objects described in FIG. 1 and the accompanying description.

In Step 490, one or more interface actions are determined based, at least in part, on various input object locations in accordance with one or more embodiments. In some embodiments, a type of interface action can be designated in response to detecting different locations of two or more input objects in a sensing region. For example, an interface action may be performed in response to specific gesture motion, such as two fingers moving away or towards each other. Thus, a processing system and/or a host device may determine a particular interface action type based on the distance that separates two or more input objects. For example, a lookup table may designate various interface action types based on a range of separation distances. Interface action types may include content manipulation, e.g., actions performed by a user with respect to text as well as pictures, data objects, and various types of data files that are used by a computing device. Examples of content manipulation actions may include copying, moving, dragging, and cutting the content from one location within the graphical user interface. Interface action types may also include window manipulation, e.g., actions with respect to one or more GUI windows disposed in the graphical user interface. For example, a window manipulation action may maximize, minimize, and/or align a particular GUI window.

Figure 6:
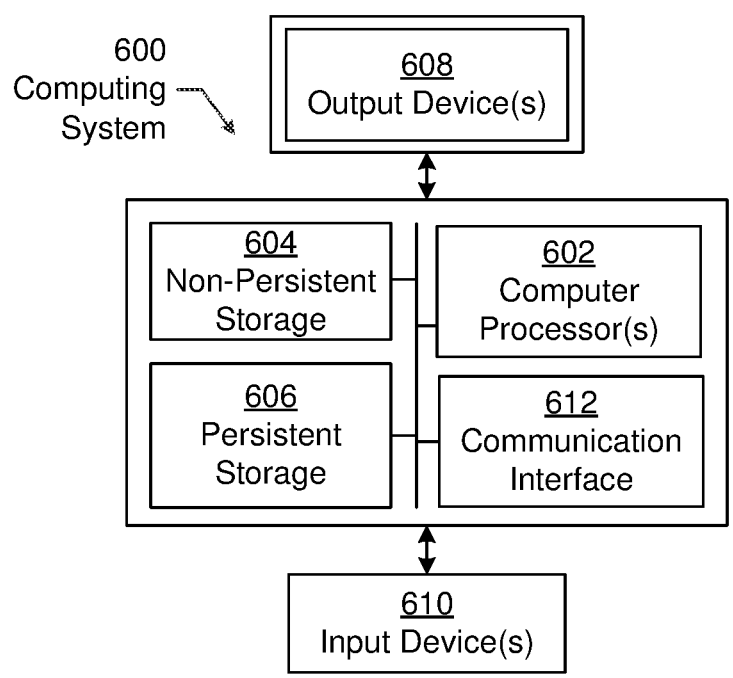
FIG. 6 shows a computing system in accordance with one or more embodiments.

FIG. 6 shows an example computing system within which various embodiments may be implemented. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements to perform various functions.

The computer processor(s) (602) may be an integrated circuit for processing instructions. For example, the computer processor(s) (602) may include one or more cores or micro-cores. The computing system (600) may also include one or more input devices (610), such as a touchscreen, keyboard, mouse, microphone, touchpad, electronic pen, or other types of input devices.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display devices), a printer, external storage, or other output devices. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosed technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosed technology.

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosed technology. The processes may be part of the same or different application and may execute on the same or different computing system.

Rather than or in addition to sharing data between processes, the computing system performing one or more embodiments of the disclosed technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosed technology, may extract one or more data items from the obtained data. For example, the extraction may be performed as follows by the computing system (600) in FIG. 6. First, the organizing pattern (e.g., grammar, schema, layout) of the data is determined, which may be based on one or more of the following: position (e.g., bit or column position, $N_{th}$ token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6, while performing one or more embodiments of the disclosed technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosed technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The computing system of FIG. 6 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computing device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 6. Other functions may be performed using one or more embodiments of the disclosed technology.

While the disclosed technology has been described with respect to a limited number of embodiments, those skilled in the art, having benefit of this disclosed technology, will appreciate that other embodiments can be devised which do not depart from the scope of the disclosed technology as disclosed herein. Accordingly, the scope of the disclosed technology should be limited only by the attached claims.

What is claimed is:

1. A processing system coupled with an input device, comprising:
   a sensor module, the sensor module configured to:
      obtain a capacitive image of a plurality of sensor pixels in the input device, wherein the capacitive image comprises a plurality of capacitive measurements resulting from a first input object and a second input object in a sensing region; and
   a determination module, the determination module configured to:
      obtain a plurality of pixel response functions corresponding to the plurality of sensor pixels,
      determine, from the capacitive image and using a search method and the plurality of pixel response functions, a first plurality of capacitive contributions of the first input object and a second plurality of capacitive contributions of the second input object,
      compare, with the capacitive image, the first plurality of capacitive contributions and the second plurality of capacitive contributions to produce a comparison,
      determine, based at least in part on the comparison, whether the first plurality of capacitive contributions and the second plurality of capacitive contributions satisfy a predetermined criterion,
      update, using the search method, the first plurality of capacitive contributions and the second plurality of capacitive contributions in response to failing to satisfy the predetermined criterion, and
      determine, using the first plurality of capacitive contributions and the second plurality of capacitive contributions, a first location of the first input object and a second location of the second input object.

2. The processing system of claim 1,
   wherein the capacitive image comprises a single capacitive peak, and
   wherein the first location of the first input object and the second location of the second input object is determined within the single capacitive peak.

3. The processing system of claim 1, wherein the determination module is further configured to:
   determine a first peak pixel value and a second peak pixel value from the capacitive image,
   wherein the first plurality of capacitive contributions of the first input object correspond to the first input object being located at the first peak pixel value, and
   wherein the second plurality of capacitive contributions of the second input object correspond to the second input object being located at the second peak pixel value.

4. The processing system of claim 1, wherein the predetermined criterion corresponds to a convergence between the capacitive image and the first plurality of capacitive contributions and the second plurality of capacitive contributions.

5. The processing system of claim 1, wherein the search method iteratively adjusts the first plurality of capacitive contributions and the second plurality of capacitive contributions until the predetermined criterion is satisfied.

6. The processing system of claim 1, wherein the capacitive image is obtained from a plurality of resulting signals from a plurality of receiver electrodes in response to one or more sensing signals being transmitted over one or more transmitter electrodes.

7. The processing system of claim 1, wherein the search method comprises an iterative matrix-solver.

8. The processing system of claim 1, wherein the determination module is further configured to:
   determine one or more interface actions based, at least in part, on the first location of the first input object and the second location of the second input object.

9. The processing system of claim 1, wherein the determination module is further configured to:
   determine a number of peak pixel values in the capacitive image;
   determine a number of input objects in the sensing region based at least in part on the number of peak pixel values; and
   determine a type of pixel response function for a sensor pixel among the plurality of sensor pixels based at least in part on the number of input objects.

10. An input device, comprising:
   a plurality of transmitter electrodes configured to transmit one or more sensing signals;
   a plurality of receiver electrodes configured to obtain a plurality of resulting signals in response to transmitting the one or more sensing signals; and
   a processing system operatively connected to the plurality of receiver electrodes and the plurality of transmitter electrodes, the processing system configured to:
      obtain, from the plurality of resulting signals, a capacitive image of a plurality of sensor pixels among the plurality of receiver electrodes,
      obtain a plurality of pixel response functions corresponding to the plurality of sensor pixels,
      determine, from the capacitive image and using a search method and the plurality of pixel response functions, a first plurality of capacitive contributions of a first input object and a second plurality of capacitive contributions of a second input object, compare, using the plurality of pixel response functions and with the capacitive image, the first plurality of capacitive contributions and the second plurality of capacitive contributions to produce a comparison, determine, based at least in part on the comparison, whether the first plurality of capacitive contributions and the second plurality of capacitive contributions satisfy a predetermined criterion, update, using the search method, the first plurality of capacitive contributions and the second plurality of capacitive contributions in response to failing to satisfy the predetermined criterion, and determine, using the first plurality of capacitive contributions and the second plurality of capacitive contributions, a first location of the first input object and a second location of the second input object.

11. The input device of claim 10, wherein the capacitive image comprises a single capacitive peak, and wherein the first location of the first input object and the second location of the second input object is determined within the single capacitive peak.

12. The input device of claim 10, wherein the processing system is further configured to:

determine a first peak pixel value and a second peak pixel value from the capacitive image, wherein the first plurality of capacitive contributions of the first input object correspond to the first input object being located at the first peak pixel value, and wherein the second plurality of capacitive contributions of the second input object correspond to the second input object being located at the second peak pixel value.

13. The input device of claim 10, wherein the predetermined criterion corresponds to a convergence between the capacitive image and the first plurality of capacitive contributions and the second plurality of capacitive contributions.

14. The input device of claim 10, wherein the search method iteratively adjusts the first plurality of capacitive contributions and the second plurality of capacitive contributions until the predetermined criterion is satisfied.

15. The input device of claim 10, wherein the capacitive image is obtained from the plurality of resulting signals from the plurality of receiver electrodes in response to one or more sensing signals being transmitted over one or more transmitter electrodes.

16. A method, comprising:

obtaining a capacitive image of a plurality of sensor pixels in an input device, wherein the capacitive image comprises a plurality of capacitive measurements resulting from a first input object and a second input object in a sensing region of the input device; and obtaining a plurality of pixel response functions corresponding to the plurality of sensor pixels;

determining, from the capacitive image and using a search method and the plurality of pixel response functions, a first plurality of capacitive contributions of the first input object in the capacitive image and a second plurality of capacitive contributions of the second input object;

comparing, with the capacitive image, the first plurality of capacitive contributions and the second plurality of capacitive contributions to produce a comparison;

determining, based at least in part on the comparison, whether the first plurality of capacitive contributions and the second plurality of capacitive contributions satisfy a predetermined criterion;

updating, using the search method, the first plurality of capacitive contributions and the second plurality of capacitive contributions in response to failing to satisfy the predetermined criterion; and determining, using the first plurality of capacitive contributions and the second plurality of capacitive contributions, a first location of the first input object and a second location of the second input object.

17. The method of claim 16, wherein the capacitive image comprises a single capacitive peak, and wherein the first location of the first input object and the second location of the second input object is determined within the single capacitive peak.

* * * * *